Patented Oct. 26, 1926.

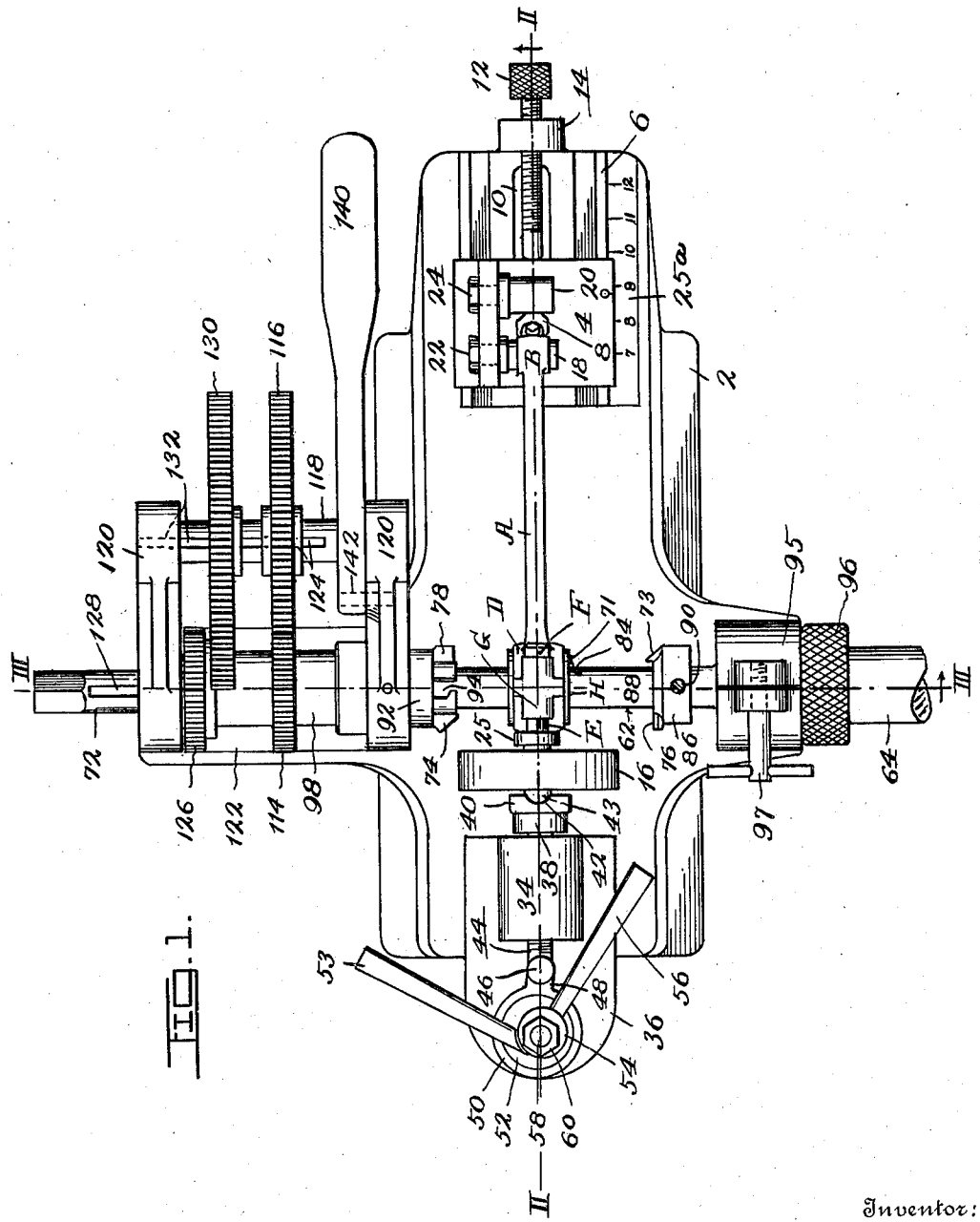

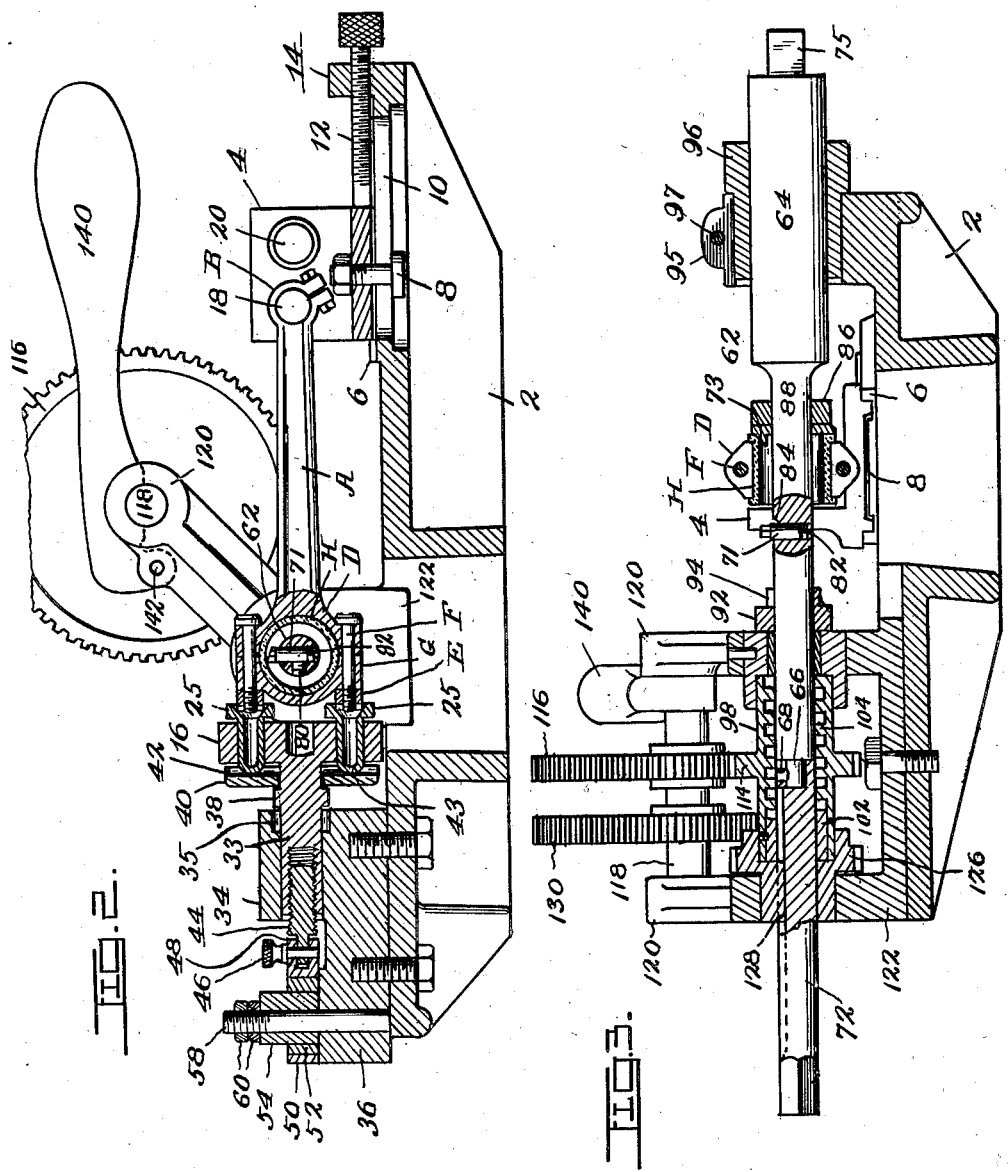

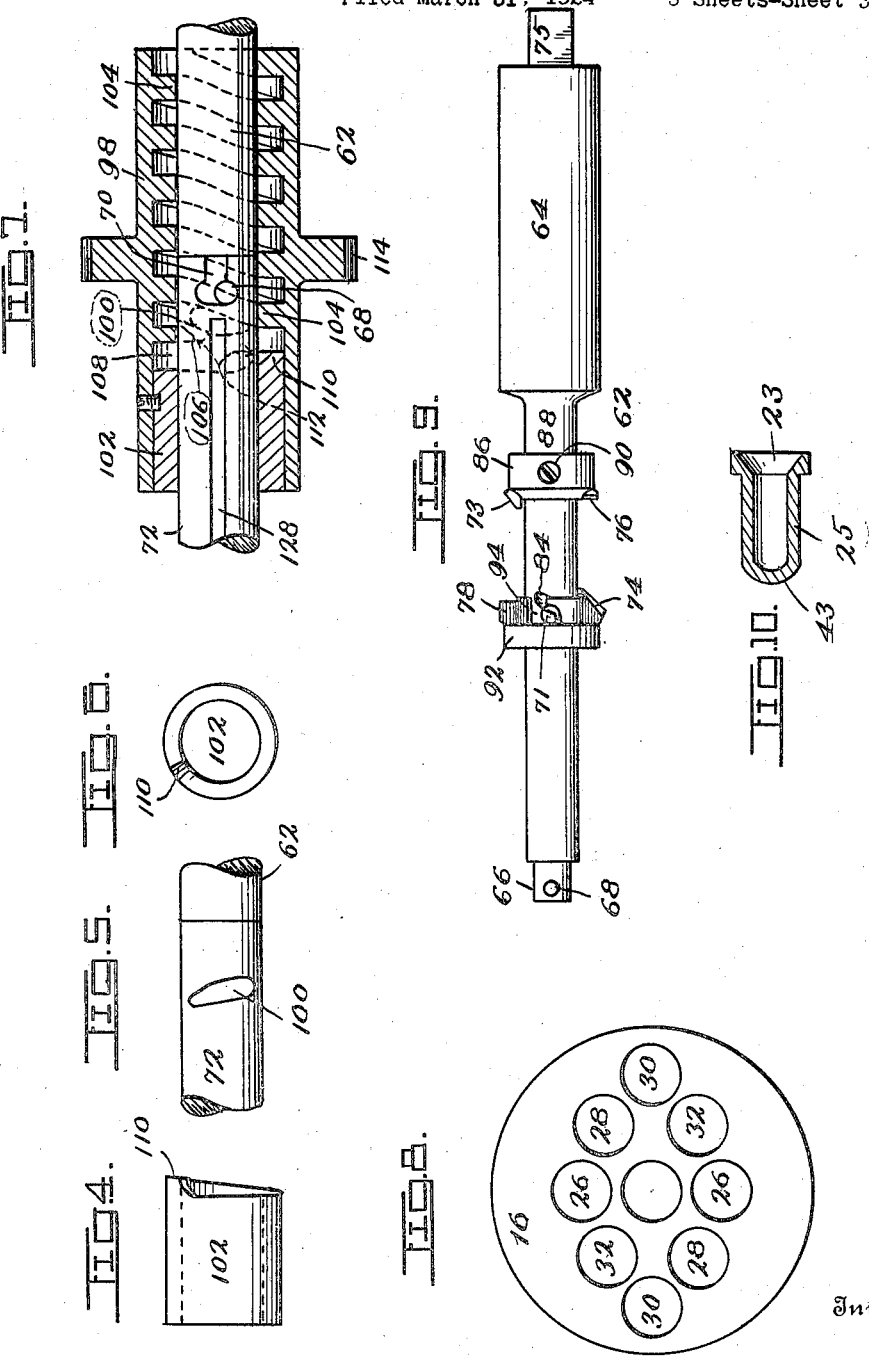

1,604,940

UNITED STATES PATENT OFFICE.

WILBUR J. HEMPY, OF KANSAS CITY, MISSOURI.

COMBINATION BORING AND FACING MACHINE.

Application filed March 31, 1924. Serial No. 703,280.

My invention relates to improvements in combination boring and facing machines and while it may be used for boring and facing a variety of articles, it is intended more particularly for boring and facing the Babbitt bearings of connecting rods, such, for instance, as are employed in internal combustion engines for connecting the pistons to the crank shaft.

My object is to provide a new and useful machine of this character in which the parts are so combined and organized that the work of boring out the babbitted bearings to proper size and facing and beveling the same can be quickly and accurately performed.

In order that the invention may be fully understood, reference will now be had to the accompanying drawings, in which:

Fig. 1 is a plan view of the machine with a connecting rod in position to have its main bearing Babbitt-lining bored out, faced and reamed.

Fig. 2 is a vertical longitudinal section on line II—II of Fig. 1.

Fig. 3 is a vertical cross section on line III—III of Fig. 1, with the boring mandrel adjusted to the left.

Fig. 4 is a detail side elevation of a cam employed in carrying out the invention.

Fig. 5 is a broken detail of a shaft and the mandrel.

Fig. 6 is an end elevation of the cam shown by Fig. 4.

Fig. 7 is an enlarged detail, partly in section, of a feed nut, the cam, and a portion of the shaft and the mandrel.

Fig. 8 is an enlarged detail elevation of a centering chuck.

Fig. 9 is a detail of the boring mandrel equipped with boring, facing and reaming tools.

Fig. 10 is a detail sectional view of one of a pair of thimbles used in connection with the centering chuck.

Referring now in detail to the various parts, 2 designates a main frame or bed provided near one end with a slide 4 secured in position upon a slideway 6 by a bolt 8 extending through a longitudinal slot 10 in said slideway 6. An adjusting screw 12 threaded in an upturned lug 14 on one end of the frame 2 is employed in adjusting the slide 4 towards the centering chuck 16. The slide 4 is provided with laterally projecting studs 18 and 20 removably held in place by nuts 22 and 24, respectively. The studs 18 and 20 are of different diameters to fit into the small bearings at one end of different sized connecting rods. A scale 25$^a$ is provided on the frame 2, adjacent to the slide 4 to enable the same to be quickly adjusted to accommodate connecting rods of different lengths.

In Figs. 1 and 2, I have shown a connecting rod A with its small bearing B in position on the smaller stud 18, while its large end, containing the babbitted bearing D which fits on the crank-shaft of an engine, is supported by thimbles 25 of the centering-chuck 16. The thimbles 25 have sockets 23 to receive the nuts E which coact with bolts F in holding the bearing cap G in position on the connecting rod A.

As shown by Fig. 8, the centering chuck 16 has pairs of diametrically opposed holes 26, 28, 30 and 32, paralleling its axis and each pair being spaced at a different distance than its companions from said axis, so that the thimbles 25 may be readily adjusted to receive the nuts E, which are spaced at different distances apart on connecting rods of different types and sizes.

The centering chuck 16 is fixedly mounted upon a longitudinally adjustable shaft 33, journaled in a bearing 34 fixed upon a block 36, secured to the end of the main frame 2 opposite the end provided with the lug 14. The shaft 33 has a collar 38 spaced slightly to the rear of the chuck 16 to hold a stop 40 against the rear ends of the thimbles 25. Said stop 40 has a longitudinal groove 42 to receive the rear ends 43 of the thimbles 25, and is loosely mounted on the shaft 33. The bearing 34 has a recess 35, Fig. 2, at one end to receive the collar 38, when the shaft 33 is adjusted rearwardly to accommodate the longer connecting rods.

The shaft 33 is counterbored and internally threaded to receive an adjusting screw 44 connected at its rear end by a pivot 46 to a clevis 48 projecting from an eccentric strap 50 encircling a large eccentric 52 provided with a handle 53 and journaled upon a small eccentric 54 provided with a handle 56. The small eccentric 54 is journaled upon a stud 58 projecting vertically from the block 36 and provided at its upper threaded end with lock nuts 60 for holding the eccentric 54 down upon said block 36, Figs. 1 and 2. The small eccentric 54 projects above the large eccentric 52, so that the handles 56 and 58 may pass each other when adjusting the respective eccentrics.

62 designates the boring mandrel, the axis of which intersects an imaginary extension of the axis of the shaft 33. In order to lend stability to said boring mandrel 62 and obviate any lateral deflection thereof while in operation, its journal 64 is enlarged diametrically as best shown by Fig. 9. The opposite reduced end 66 of the mandrel 62 is provided with a peripheral stud 68 for entering the slotted end 70 of a shaft 72, which is counterbored as shown by Fig. 3, to receive said reduced end 66. The journal 64 has a reduced rectangular end 75, whereby it may be rotated by a wrench, or other suitable means, not shown.

The boring mandrel 62 may be provided with any suitable tools. In the present instance it is provided with a cutting tool 71, reamers 73 and 74, and facing tools 76 and 78, Figs. 1, 3 and 9. The cutting tool 71 snugly fits within a transverse hole in the mandrel 62 and is adjustably held in place by screws 80 and 82, Fig. 2, and said mandrel 62 is recessed as indicated at 84 to permit ready escape of the shavings cut from the Babbitt lining H in the connecting-rod bearing D.

The reamer 73 and the facing tool 76 are fixed to a collar 86 adjustably mounted upon the reduced portion 88 of the mandrel 62 and provided with a set screw 90 whereby it may be firmly secured in any of its adjusted positions. The reamer 74 and the facing tool 78 are fixed to a collar 92 loosely mounted on the reduced portion 88 of the mandrel 62 and provided with a bayonet slot 94 for engaging over the cutting tool 71, Fig. 9, so that when desired said collar 92 may be caused to rotate with the mandrel 62, as will hereinafter appear.

The journal 64 of the mandrel 62 is rotatably and slidably mounted in a bushing 96, which is clamped in a split bearing 95 on one side of the main frame 2. The bearing 95 has a screw 97, whereby it may be tightened to firmly grip the bushing 96 and hold the same in place. The bushing 96 is removable so that other bushings may be substituted having larger or smaller bores to accommodate boring mandrels of larger or smaller diameters for use on different sizes of connecting rods. When the mandrel 62 is rotated in one direction it rotates the shaft 72 and is drawn longitudinally thereby to carry the cutting tool 71 from end to end of the Babbitt lining H. When the shaft 72 is rotated, as stated, it is moved longitudinally through the intermediacy of a feed-nut 98 and a projecting element 100, which latter is fixed to said drive shaft 72.

The feed-nut 98 is provided at one end with an internal fixed cam 102, and one end of its internal thread 104 tapers to a point 106, which is spaced, as indicated at 108, from the inner end of said cam 102, a distance slightly greater than the thickness of the element 100. On passing said point 106, the element 100 revolves idly in the space 108 and ceases to advance the mandrel 62 longitudinally, thereby avoiding danger of damaging the machine should the operator inadvertently fail to stop the drive shaft 72 after the cutting tool 71 has traversed the width of the Babbitt lining H.

The inner end of the cam 102 has a shoulder 110 which is, approximately, diametrically-opposed to the point 106 of the thread 104 in order to leave a space 112 which is longer than the element 100, so that after the same has been carried by said point 106 into said space 112 and the direction of travel of the feed-nut 98 is reversed, said shoulder 110 on contacting the element 100 will shift the same bodily to the right against the thread 104, as indicated by dotted lines, Fig. 7. As the feed-nut 98 continues to rotate in the reverse direction the point 106 engages the left side of the element 100 and starts the same backwardly to the right through the internal thread 104.

The feed-nut 98 is provided intermediate its ends with a fixedly-mounted gear wheel 114 adapted to intermesh with a gear wheel 116 upon a counter shaft 118, journaled in bearings 120 on a sub-frame 122, secured upon the main frame 2. The gear wheel 116 has a groove-and-feather connection 124 with the countershaft 118, so that it may be shifted out of gear with the gear wheel 114, for a purpose which will hereinafter appear.

The shaft 72 has a groove-and-feather connection 128 with a pinion 126 journaled in the sub-frame 122, so that it may drive said pinion 126 and also be moved longitudinally therein by the feed-nut 98. The pinion 126 is arranged to drive a gear wheel 130 mounted upon the countershaft 118, with which it has a groove-and-feather connection 132, so that it may drive said countershaft 118 and also be shifted out of mesh with the pinion 126.

The gears 126, 130, 116 and 114 are proportioned to drive the feed-nut 98 slightly faster than the mandrel 62 and the shaft 72 are driven, so that the latter will be advanced longitudinally and draw the mandrel 62 therewith at relatively low speed. By thus slowly advancing the mandrel 62 longitudinally with the cutting tool 71, the cut made at each revolution will overlap the preceeding cut and thus leave the bored surface of the Babbitt lining H smooth throughout its width.

In practice the mandrel 62 is disconnected from the shaft 72 and withdrawn to the right, Fig. 3, so that the connecting-rod A can be mounted on the stud 18 and the thimbles 25. The mandrel 62 is then reconnected to the shaft 72, the cutting tool 71 having been previously adjusted to enlarge the bore of the Babbitt lining H to the desired diameter. The mandrel 62 is then rotated in a direction to cause it to be fed longitudinally to the left, Fig. 3. As the shaft 72 is rotated by the mandrel 62, it drives the feed-nut 98 through the intermediacy of the gears 126, 130, 116 and 114; and said feed-nut 98, through the intermediacy of the element 100, advances said shaft 72 and the mandrel 62 to the left, until the cutting tool 71 passes through the bore of the Babbitt lining H from end to end, and the reaming tool 73 and the facing tool 76 ream and face, respectively, the adjacent end of said Babbitt lining H. The mandrel 62 is then stopped and the collar 92 is slipped to the right until its slotted portion 94 engages over the cutting tool 71. The mandrel 62 is then driven in a reverse direction to cause it to be moved longitudinally to the right, Fig. 3, until the reamer 74 and the facing tool 78 ream and face, respectively, the left end of the Babbitt lining H. After the last operation has been accomplished, the shaft 72 and the mandrel 62 are again advanced longitudinally to the left until the tools 74 and 78 clear the Babbitt lining H, whereupon the collar 92 is disconnected from the cutting tool 71. The mandrel 62 and the shaft 72 are then adjusted longitudinally to the right after which said mandrel 62 is disconnected from the shaft 72 and withdrawn from the collar 92 and the Babbitt lining H, so that the connecting-rod A can be removed from its supports. The longitudinal movement of the mandrel 62 and the shaft 72 to the right can be accelerated by shifting the gear 130, out of mesh with the pinion 126, and holding the feed-nut 98 stationary through the intermediacy of the gears 114, 116, and a lever 140 connected by a pivot 142 to the adjacent bearing 120 and frictionally engaging the shaft 118 to hold the same stationary.

From the foregoing description taken in connection with the drawings, it is apparent that I have provided a jig embodying the advantages above pointed out; and while I have shown and described the preferred combination and arrangement of parts I reserve the right to make such changes as properly fall within the spirit and scope of the invention as claimed. Having thus described my invention, what I claim and desire to secure by Letters Patent, is:

1. In a machine of the character described, a mandrel provided with a suitable tool for operating on the babbitt bearing of a connecting-rod, mechanism for actuating said mandrel, a support for one end of the connecting-rod, a centering-chuck with pairs of diametrically-opposed holes paralleling its axis and each pair being spaced at a different distance than its companions from said axis, and a pair of thimbles adapted to be mounted in any of said holes for supporting the other end of the connecting-rod with its babbitted bearing in axial alinement with the mandrel.

2. In a machine of the character described, a mandrel provided with a suitable tool for operating on the babbitted bearing of a connecting-rod, mechanism for actuating said mandrel, a support for one end of the connecting-rod, a centering-chuck, means carried by said centering-chuck for supporting the other end of the connecting-rod with its babbitted bearing in axial alinement with the mandrel, a threaded shaft upon which said centering-chuck is mounted, and threaded means engaging said shaft to adjust the same longitudinally, so that the centering-chuck can accommodate connecting-rods of different lengths.

3. In a machine of the character described, a mandrel provided with a suitable tool for operating on the babbitted bearing of a connecting-rod, mechanism for actuating said mandrel, a support for one end of the connecting-rod, a centering-chuck, means carried by said centering-chuck for supporting the other end of the connecting-rod with its babbitted bearing in axial alinement with the mandrel, a shaft slidably and rotatably mounted and carrying said centering-chuck, and eccentric means for adjusting said shaft longitudinally so that the centering-chuck can accommodate connecting-rods of different lengths.

4. In a machine of the character described, a mandrel provided with a suitable tool for operating on the babbitted bearing of a connecting-rod, mechanism for actuating said mandrel, a support for one end of the connecting-rod, a centering-chuck, means carried by said centering-chuck for supporting the other end of the connecting-rod with its babbited bearing in axial alinement with the mandrel, a shaft slidably and rotatably mounted and carrying said centering-chuck, eccentric means for adjusting said shaft longitudinally so that the centering-chuck can accommodate connecting-rods of different lengths, a handle to said eccentric means, and an eccentric for locking said eccentric means in any of its adjusted positions.

5. In a machine of the character described, a mandrel provided with a suitable tool for operating on the babbitted bearing of a connecting-rod, a shaft for moving said mandrel longitudinally to carry the tool into operative or inoperative relation with the babbitted lining, a projecting element on said shaft, a journaled feed-nut engaging said projection to move the shaft longitudinally, a support for one end of the connecting-rod, a centering-chuck with pairs of diametrically-opposed holes paralleling its axis and each pair being spaced at a different distance than its companions from said axis, and a pair of thimbles adapted to be mounted in any of said holes for supporting the other end of the connecting-rod with its babbitted bearing in axial alinement with the mandrel.

6. In a machine of the character described, a mandrel provided with a suitable tool for operating on the babbitted bearing of a connecting-rod, a shaft for moving said mandrel longitudinally to carry the tool into operative or inoperative relation with the babbitted lining, a projecting element on said shaft, a journaled feed-nut engaging said projection to move the shaft longitudinally, a support for one end of the connecting-rod, a centering-chuck, means carried by said centering-chuck for supporting the other end of the connecting-rod with its babbitted bearing in axial alinement with the mandrel, a shaft slidably and rotatably mounted and carrying said centering-chuck, and eccentric means for adjusting said shaft longitudinally so that the centering-chuck can accommodate connecting-rods of different lengths.

7. In a machine of the character described, connecting rod supporting mechanism consisting of a rotatable centering chuck having diametrically opposed openings arranged in pairs and each pair being spaced at different distances from the axis of said chuck, elements for placement in any of said openings to support one end of connecting rods of different sizes, supporting means for the opposite end of the connecting rods, and mechanism for varying the distance between the last-mentioned support and the centering chuck.

8. In a machine of the character described, connecting rod supporting mechanism consisting of a rotatable centering chuck having openings spaced various distances from its axis, thimbles for placement in any of said openings to receive and support the variously spaced nuts at one end of connecting rods of different sizes, and supporting means for the opposite end of the connecting rods.

In testimony whereof I affix my signature.

WILBUR J. HEMPY.